(12) United States Patent
Hagy

(10) Patent No.: US 11,063,834 B2
(45) Date of Patent: Jul. 13, 2021

(54) COMPUTING ENVIRONMENT NODE AND EDGE NETWORK TO OPTIMIZE DATA IDENTITY RESOLUTION

(71) Applicant: LiveRamp, Inc., San Francisco, CA (US)

(72) Inventor: Matthew C. Hagy, San Francisco, CA (US)

(73) Assignee: LiveRamp, Inc., San Francisco, CA (US)

(*) Notice: Subject to any disclaimer, the term of this patent is extended or adjusted under 35 U.S.C. 154(b) by 0 days.

(21) Appl. No.: 16/650,776

(22) PCT Filed: Sep. 12, 2018

(86) PCT No.: PCT/US2018/050584
§ 371 (c)(1),
(2) Date: Mar. 25, 2020

(87) PCT Pub. No.: WO2019/070379
PCT Pub. Date: Apr. 11, 2019

(65) Prior Publication Data
US 2020/0244537 A1 Jul. 30, 2020

Related U.S. Application Data

(60) Provisional application No. 62/566,741, filed on Oct. 2, 2017.

(51) Int. Cl.
*H04L 12/24* (2006.01)
*H04L 29/08* (2006.01)

(52) U.S. Cl.
CPC .............. *H04L 41/12* (2013.01); *H04L 67/28* (2013.01)

(58) Field of Classification Search
CPC ...... H04L 41/12; H04L 67/28; G06Q 10/0633; G06Q 30/02
See application file for complete search history.

(56) References Cited

U.S. PATENT DOCUMENTS 9,672,293 B2 6/2017 Parker et al.
9,703,845 B2 7/2017 Iesiev et al.
(Continued)

FOREIGN PATENT DOCUMENTS

WO 2017132073 A1 8/2017

OTHER PUBLICATIONS

Summer et al. "The Network Library: a framework to rapidly integrate network biology resources." In: Bioinformatics. Aug. 29, 2016, p. 1-6 (Year: 2016).*
(Continued)

*Primary Examiner* — Tonia L Dollinger
*Assistant Examiner* — Joseph M Cousins

(57) ABSTRACT

A system and method utilizes a data integration input routine receive raw data set(s) from identity data storage media resources, generate an edge type from each data set, and store the edge type from each data set in a first temporary storage media, from which a graph construction module retrieves the edge types and combines them to produce a consolidated edge store, a search of which is used to find graph component paths. Current paths are joined against the consolidated edge store to find edges that extend each path in the consolidated edge store, those paths that extend are stored in a graph component table, from which a sample of graph paths are downloaded and a graph is constructed. A circuit analysis engine is used to perform a circuit analysis and a selectivity module is used to selectively modify the scope of the circuit analysis and results.

8 Claims, 7 Drawing Sheets

(56) References Cited

U.S. PATENT DOCUMENTS

| | | | | |
|---|---|---|---|---|
| 2010/0332475 | A1* | 12/2010 | Birdwell | G06F 16/283 |
| | | | | 707/737 |
| 2013/0204894 | A1* | 8/2013 | Faith | G06Q 50/01 |
| | | | | 707/769 |
| 2015/0370814 | A1 | 12/2015 | Liodden et al. | |
| 2016/0125067 | A1* | 5/2016 | Alexe | G06F 16/256 |
| | | | | 707/603 |
| 2017/0098013 | A1 | 4/2017 | Shirwadkar et al. | |
| 2017/0099525 | A1 | 4/2017 | Ray et al. | |

OTHER PUBLICATIONS

Yang et al., "Measuring User Similarity Using Electric Circuit Analysis: Application to Collaborative Filtering," PLOS ONE vol. 7, Issue 11, journals.plos.org/plsone/article?id=10.1371/journal.pone. 0049126 (Nov. 7, 2012).

Treeratpituk et al., "Disambiguating Authors in Academic Publications Using Random Forests," Proceedings of the 9th ACM/IEEE—CS Joint Conference on Digital Libraries (Dec. 31, 2009).

Slefo, "Marketers Need 'Identity Graphs,' but Are They as Accurate as Advertised?", Advertising Age, adage.com/article/digital/marketers-identity-graphs-accurate/305787/ (Sep. 12, 2016).

Abdala, "Cross-Device ID Graph Accuracy: Methodology," Lotame Solutions, Inc., lotame.com/cross-device-id-graph-accuracy-methodology/ (Aug. 17, 2017).

Khabsa et al., "Large Scale Author Name Disambiguation in Digital Libraries," Proceedings of the IEEE Int'l Conf. on Big Data, clgiles.ist.psu.edu/pubs/IEEE-2014-bigdata.pdf (Dec. 31, 2014).

* cited by examiner

PRIOR ART

COMPUTING ENVIRONMENT NODE AND EDGE NETWORK TO OPTIMIZE DATA IDENTITY RESOLUTION

TECHNICAL FIELD

The field of the invention is computing networks for optimizing the measurement and accuracy of identity resolution, that is, the accuracy with which records pertaining to an object in a computing environment are accurately correlated with the object they represent.

BACKGROUND ART

Identity resolution is a critical matter in many industries, including, for example, marketing support services. A marketing database many contain hundreds of millions of individual records or data elements, and although records may not contain precisely the same data, they may nevertheless be associated with the same object. For example, one data element may be a name, one may be an email address, and another may be a mobile telephone number. Correctly resolving these various digital data elements as being associated with the same object (in this case, a person), and avoiding the miscorrelation of data elements that do not pertain to the same object, is necessary for the successful deployment of such a comprehensive marketing database. A method of measuring the accuracy of the resolution process that is performed in such a database provides insight into the success of the resolution effort, and may therefore drive improved resolution methods. Given the enormous size of such databases—often containing billions of individual data elements—computational efficiency is also of great importance, because inefficient network solutions would be incapable of resolving data-object correlations in a practical time period.

In general, graphical approaches to the determination of a degree of relationship among certain types of data representations are known. US Patent Application Publication No. 2017/0099525 A1 to Ray et al. teaches a graphical method of optimizing the positioning of advertisements to a consumer across multiple devices associated with that consumer. To perform this function, consumer graphs are constructed where edges between the consumer nodes are used to represent the degree of similarity between consumers. In addition, US Patent Application Publication No. 2015/0370814 A1 to Liodden et al. teaches a method of determining if behavior across multiple devices originates from the same user. The method uses device graphs to map devices to nodes in the graph.

While graphical data analysis has been used in some prior art applications, the ability to measure the accuracy of data resolution in a large, comprehensive database has not been achieved. The inventor hereof has, however, recognized the potential advantages of a method and system that could successfully utilize electrical circuit analysis techniques to measure the accuracy of object resolution within a database, particularly with respect to massive, comprehensive databases.

References mentioned in this background section are not admitted to be prior art with respect to the present invention.

SUMMARY OF THE INVENTION

The present invention is directed to a method and system for applying electrical circuit analysis techniques to measure the accuracy of object resolution within a database, particularly but not exclusively with respect to a massive, comprehensive database or set of databases containing records pertaining to hundreds of millions or even billions of data elements. One non-limiting example of such a database amenable to the invention in various implementations is a marketing database that contains data elements pertaining to individuals, households, or businesses. Such databases may receive source data elements from many third-party providers. A graph is constructed that includes nodes and edges that connect the nodes. The nodes represent data elements pertaining to objects. The strength of the connection (edges) between nodes is proportional to the likelihood that the data elements pertain to the same object. For example, an edge between a telephone number and an email address is a measure of the likelihood that the email and telephone number (data elements) pertain to the same person (object). The strength of the connection can be the result of multiple edges between the same two nodes, such as, for example, when the connection is derived from multiple sources, and each edge represents a connection from one source. This is equivalent to a "parallel" connection in electrical circuit analysis, and the strength of the multiple connecting edges is additive in such case as the edges are treated as resistors. In addition, there may be indirect connection between nodes, where there are one or more intervening nodes in the sequence that leads to the connection; in this case, the weakest edge between all of the nodes in the chain is a measure of the strength of the connection. This is equivalent to a "series" connection in electrical circuit analysis. By treating these types of connections as series and parallel connections, the Kirchhoff circuit analysis laws of electrical circuit analysis may be adapted to determine a measure of the accuracy of entity resolution among the objects.

Although the examples used herein pertain to a specific type of database containing specific types of data elements pertaining to specific type of objects, the invention in its various implementations is not limited to such a database, these particular data elements, or these particular objects.

These and other features, objects and advantages of the present invention will become better understood from a consideration of the following detailed description of the preferred embodiments and appended claims in conjunction with the drawings as described following:

DESCRIPTION OF EMBODIMENTS

The present invention will be described below with reference to one or more specific implementations; it is understood, however, that these implementations are not limiting to the invention, and the full scope of the invention is as will be set forth in any claims directed to the invention in this or a subsequent application directed to the invention.

Figure 10:
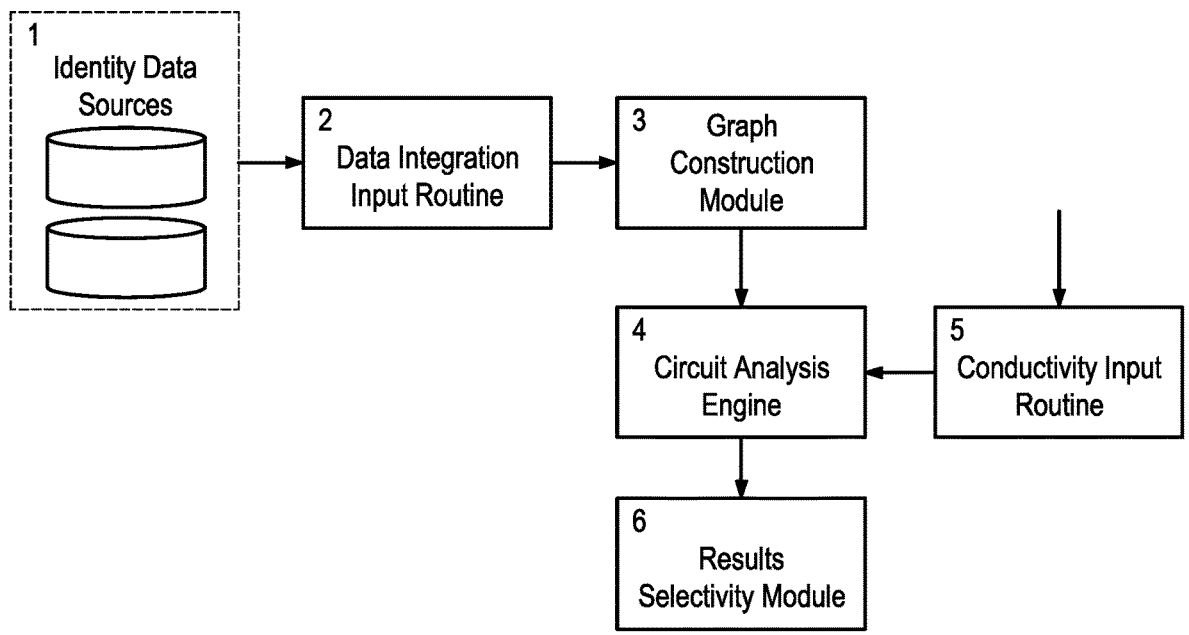
FIG. 10 is a schematic diagram illustrating the program modules of one embodiment of the system of the present invention.

The invention may be described as utilizing computer-executable instructions, such as program modules, being executed by one or more computers. The program modules include routines, programs, objects, components, and data structures, which perform particular tasks or implement particular data types in a computing environment as described more fully herein, and as shown in FIG. 10.

In identity resolution according to the implementations of the invention as described herein, different identifiers (e.g., emails, postal addresses, and telephone numbers) for the same object (e.g., a consumer) are connected together, and the data takes the form of a graph whereby the identifiers are nodes and the connections between them are edges. Methods are needed to determine the quality of each edge so that incorrect edges can be eliminated. The implementations described herein solve this problem by applying additional data on select nodes (e.g., demographic data such as gender associated with an email), adding edges between nodes based upon whether they have the same such value, and performing a circuit analysis of the graph to compute a quality score for each edge. Referring now to FIG. 10, the data is received from identity data sources 1 and integrated into the graph through a data integration input routine 2, which receives the data from the data sources 1 and stores the data in a temporary storage area for processing by a graph construction module 3, which constructs a graph, an example of which is described below. Upon the construction of the graph by the graph construction module 3 and upon receiving conductivity parameters (e.g., conductivity calculation constants, as described below) through the conductivity input routine 5, the circuit analysis engine 4 is utilized to perform a qualitative analysis of the connecting edges between nodes, as described below. Finally, the user has the ability to selectively target results by changing parameters and scope of the circuit analysis utilizing the results selectivity module 6.

Figure 1:
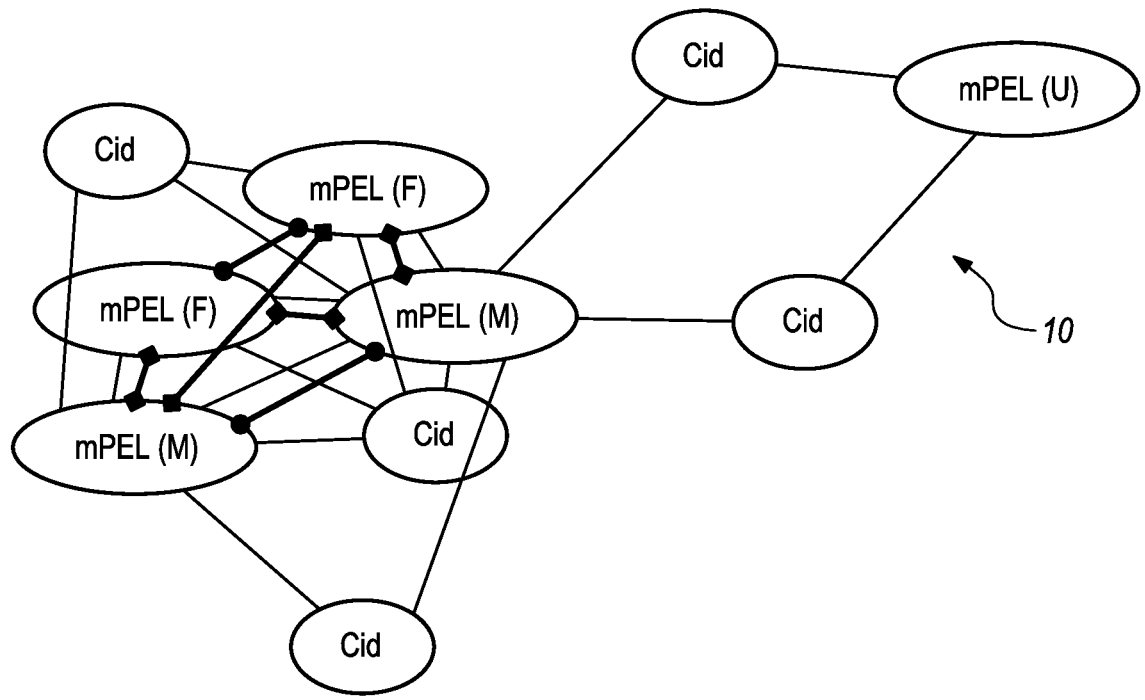
FIG. 1 is a graph according to an implementation of the present invention.

As an example, consider the graph component 10 of FIG. 1, which contains two types of identifiers. One type, referred to as mPELs, is an internal identifier used to represent an anonymized name and postal address in this example. The other type, referred to as Cids, is a data partner specific identifier; in other words, it identifies the source of the data element in the graph in order to distinguish the various sources, as will be used later on. The mPEL nodes are augmented with gender demographic data when known; this is illustrated in FIG. 1 as F for female, M for male, and U for unknown. Edges are created between pairs of mPELs with known gender. The weight of the created demographic edges depends upon whether the mPELs have the same gender or different gender. In the example figure, lines with a circular endpoint denote agreement and lines with a diamond-shaped endpoint denote disagreement. Additionally, weights are associated with each of the edges between identifiers that correspond to identity data from third-party data providers.

Figure 2:
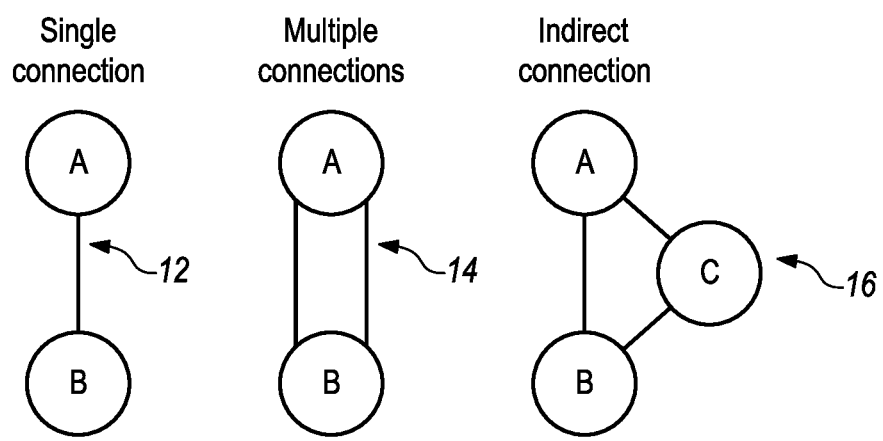
FIG. 2 is an illustration of different types of connections in a graph according to an implementation of the present invention.
Figure 3:
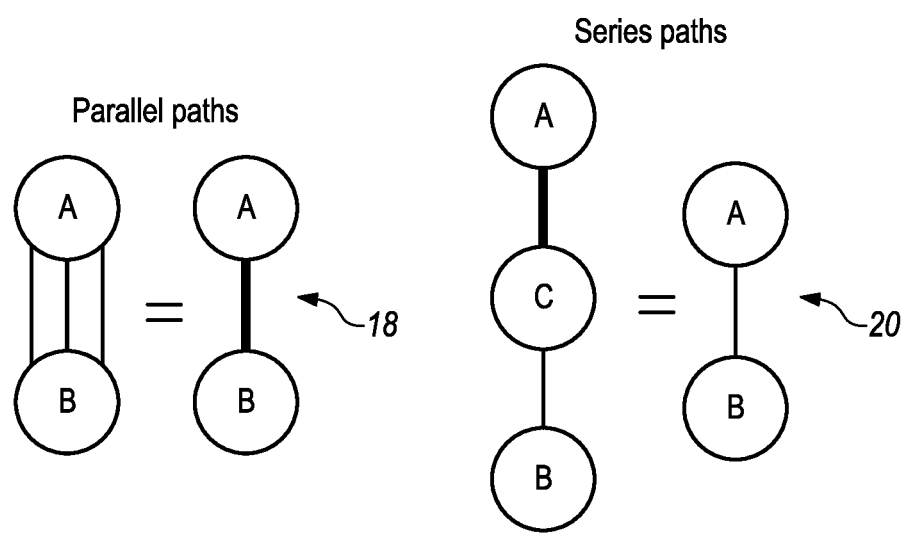
FIG. 3 is an illustration of different types of paths in a graph according to an implementation of the present invention.

Next, the quality of individual edges within the graph is computed as accounting for the degree of corroborating data for each edge. For example, consider an edge between nodes A and B as shown in the examples of FIGS. 2 and 3. FIG. 2 shows types of connections, while FIG. 3 shows types of paths. Graph 12 shows a connection from a single third-party provider. The identity resolution could be more confident in this edge if an additional third-party provider also provided the same edge between these nodes, as in graph 14. Further, one could also be more confident in the edge between A and B if both nodes were also connected to a third node C, and therefore there was an indirect connection between A and B, as in graph 16. This is all accomplished by performing a circuit analysis of the graph through circuit analysis engine 4, whereby each edge is modeled as a resistor and the total effective resistance between the pair of nodes associated with each edge is computed. Multiple parallel paths between two nodes sum together, as in graph 14 of FIG. 2 and graph 18 of FIG. 3. Series paths are restricted by the lowest conductivity edge within the path, as in the A-C-B connection in the example of graph 16 in FIG. 2 and graph 20 of FIG. 3.

Figure 4:
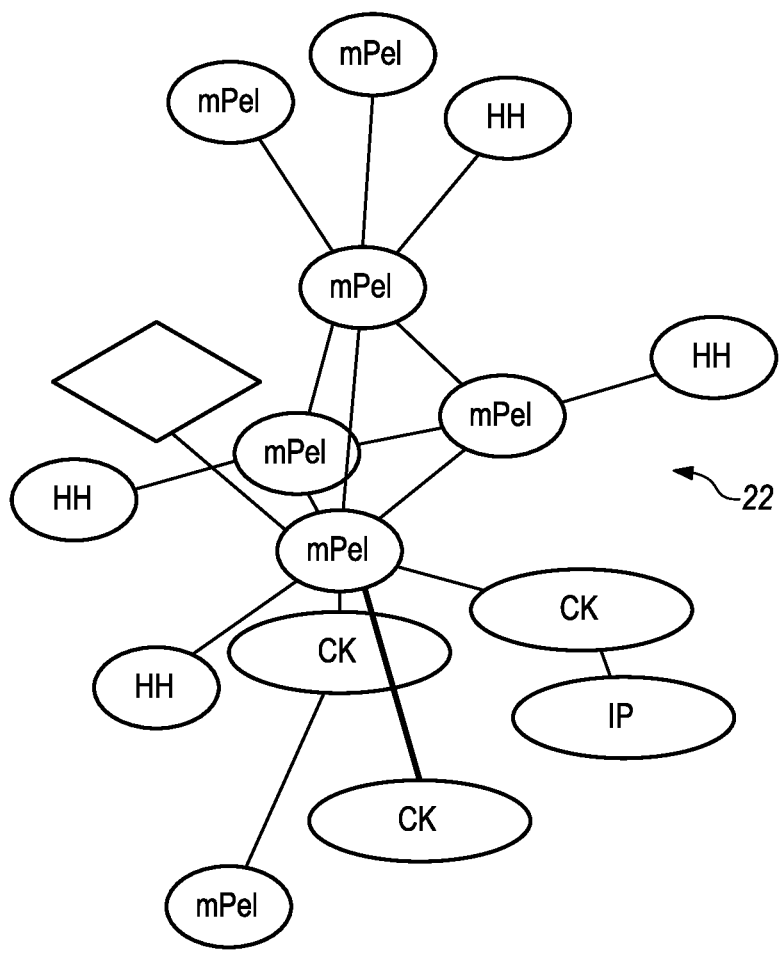
FIG. 4 is an illustration of an example slice of a graph starting from a single audience key (AK) according to an implementation of the present invention.

In a more complex example, consider an online graph slice as the example of graph slice 22 of FIG. 4 consisting of the following types of nodes/identifiers: Individual Maintained PELs (mPELs); Household PELs (HHs), which represent the object type of household rather than individual consumer; identifier web browser cookies (CKs); mobile device identifiers (MDs, not shown in FIG. 4); and IP addresses (IPs). Nodes can be connected by various types of edges, as shown below in Table 1:

TABLE 1

| Edge Type | Node Types Connected |
| --- | --- |
| COOKIE_IDENTIFICATION | CKs <-> mPELs |
| COOKIE_OBSERVATION | CKs <-> IPs |
| MOBILE_IDENTIFICATION | MDs <-> mPELs |
| MOBILE_OBSERVATION | MDs <-> IPs |
| EMAIL_PEL_MERGING | mPELs <-> mPELs |
| HOUSEHOLD | mPELs <-> HHs |
| OFFLINE_SR | mPELs <-> mPELs |

FIG. 4 shows graph slice 22 starting from a single record in an audience, illustrated as the diamond showing the audience key (AK). Edge width as illustrated in graph slice 22 scales with the number of observations, possibly from different partners.

In order to compute the overall conductivity between a pair of nodes, one must define the conductivity of each individual edge in the graph. While the user may define the conductivity of each individual edge depending on desired analysis, the constants and scaling behavior shown in Table 2 below define the conductivity of single edges in terms of the edge type in a particular implementation. Note that those edge types with linear scaling still only count at most one observation per third-party data source. For example, a cookie/PEL edge observed three times from just one third-party data source still only counts as a single observation when computing the edges conductivity. These constants and scaling behavior are integrated into circuit analysis engine 4 through conductivity input routine 5.

TABLE 2

| Edge Type | Single Edge Conductivity | Scaling |
|---|---|---|
| COOKIE_IDENTIFICATION | 1 | Linear |
| COOKIE_OBSERVATION | 0.1 | Logarithmic |
| MOBILE_IDENTIFICATION | 1 | Linear |
| MOBILE_OBSERVATION | 0.1 | Logarithmic |
| EMAIL_PEL_MERGING | 1 | Linear |
| HOUSEHOLD | 0.5 | Linear |
| OFFLINE_SR | 1 | Linear |

Figure 5:
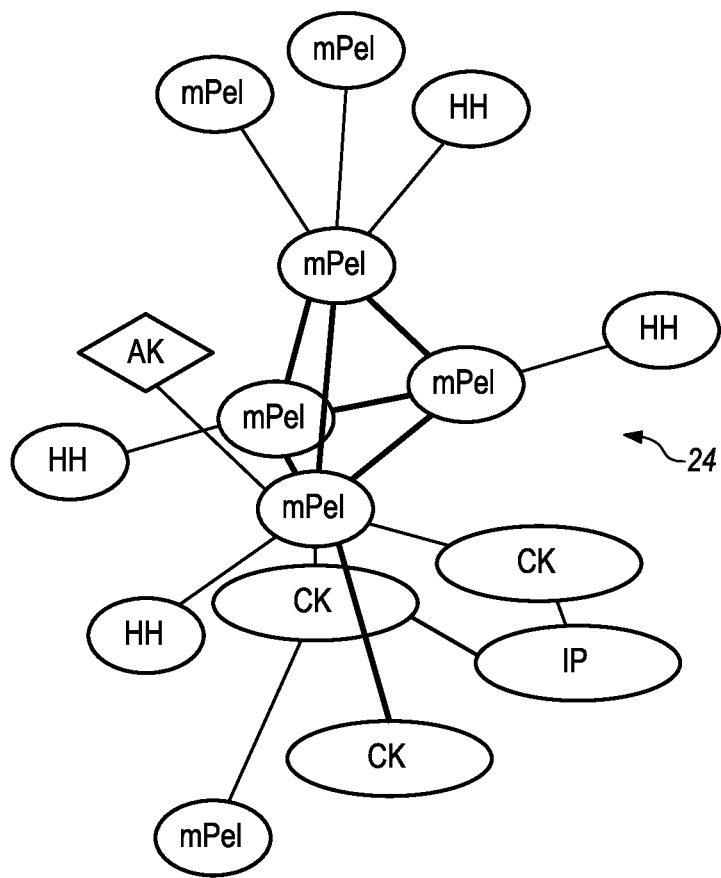
FIG. 5 is an illustration of edge scores calculated from the graph slice of FIG. 4, according to an implementation of the invention.

Using the constants shown in Table 2, each graph component is modeled as a circuit and from that the overall conductivity for each edge is computed through circuit analysis engine 4. The overall conductivity for each edge is herein defined as an edge score. FIG. 5 shows the edge scores for graph slice 22 of FIG. 4 as graph slice 24. Edge width is rendered proportional to the edge score between the pair of nodes.

Aggregating over 250 graph components in a much larger data set, a distribution of edge scores for different types of edges and edges from different third-party providers may be obtained. Table 3 lists the aggregate edge score for each type of edge in one example:

TABLE 3

| Edge Type | Count | Mean | Standard Deviation | Quantiles | | | | |
|---|---|---|---|---|---|---|---|---|
| | | | | Min | 25% | 50% | 75% | Max |
| COOKIE_IDENTIFICATION | 151,496 | 4.41 | 5.41 | 1.00 | 1.00 | 2.00 | 5.00 | 54.25 |
| COOKIE_OBSERVATION | 647,770 | 0.62 | 1.07 | 0.10 | 0.20 | 0.30 | 0.59 | 17.23 |
| EMAIL_PEL_MERGING | 64,709 | 4.89 | 6.09 | 1.00 | 1.00 | 2.58 | 6.00 | 35.10 |
| HOUSEHOLD | 19,280 | 0.66 | 0.32 | 0.50 | 0.50 | 0.50 | 0.77 | 2.82 |
| MOBILE_IDENTIFICATION | 16,035 | 1.03 | 0.13 | 1.00 | 1.00 | 1.00 | 1.00 | 2.20 |
| MOBILE_OBSERVATION | 7,111 | 0.16 | 0.13 | 0.10 | 0.10 | 0.10 | 0.17 | 1.20 |
| OFFLINE_SR | 75,482 | 2.67 | 2.79 | 1.00 | 1.00 | 1.85 | 3.00 | 35.10 |

One may compare the median edge score against the single edge conductivity constants. For the mobile edges, the median edge score is equal to the single edge conductivity, which shows there are not corroborating pathways for the median mobile edge. In contrast, for several other edge types the median score is roughly double the single edge conductivity, which shows there are other edges and indirect pathways corroborating these edge types.

One may further drill down into the accuracy of different Offline SR audiences in a particular illustrative example using data from various retailers, as listed in the following table:

TABLE 4

| Audience | | | Quantiles | | | | |
|---|---|---|---|---|---|---|---|
| Id | Name | Count | Min | 25% | 50% | 75% | Max |
| 41996 | Retailer 1 | 257 | 1.00 | 1.00 | 1.00 | 3.00 | 10.76 |
| 75976 | Retailer 2 | 827 | 1.00 | 1.00 | 1.00 | 2.00 | 11.34 |
| 138309 | Retailer 3 - Set 1 B2B Data | 87 | 1.00 | 1.00 | 1.00 | 1.32 | 8.60 |
| 140459 | Retailer 3 - Set 2 B2B Phone | 708 | 1.00 | 1.00 | 1.00 | 3.00 | 16.44 |
| 134459 | Retailer 4 | 595 | 1.00 | 1.00 | 1.00 | 1.00 | 23.41 |
| 86876 | Retailer 5 | 1023 | 1.00 | 1.00 | 1.00 | 2.49 | 21.35 |
| 113229 | Retailer 6 | 29960 | 1.00 | 1.00 | 1.25 | 2.75 | 32.36 |
| 61486 | Retailer 7 | 16692 | 1.00 | 1.00 | 1.29 | 3.00 | 34.20 |
| 8928 | Retailer 8 | 3950 | 1.00 | 1.00 | 1.66 | 3.59 | 35.10 |
| 104299 | Retailer 8 - Offline Orders | 171 | 1.00 | 1.00 | 1.74 | 4.00 | 28.00 |
| 87366 | Retailer 9 | 280 | 1.00 | 1.00 | 1.74 | 3.00 | 18.73 |
| 75986 | Retailer 10 | 27 | 1.00 | 1.00 | 1.74 | 3.83 | 6.71 |
| 66756 | Retailer 11 | 63 | 1.00 | 1.00 | 1.81 | 2.69 | 5.81 |
| 48306 | Retailer 12 | 4176 | 1.00 | 1.00 | 2.00 | 3.12 | 28.00 |
| 87516 | Retailer 13 | 763 | 1.00 | 1.00 | 2.00 | 4.00 | 14.68 |
| 19056 | Retailer 14 | 348 | 1.00 | 1.00 | 2.00 | 4.00 | 17.36 |
| 14926 | Retailer 15 | 3350 | 1.00 | 1.00 | 2.00 | 4.22 | 25.02 |
| 110529 | Retailer 16 | 2028 | 1.00 | 1.00 | 2.00 | 3.00 | 27.69 |
| 30066 | Retailer 17 | 356 | 1.00 | 1.00 | 2.00 | 4.00 | 34.20 |
| 111629 | Retailer 18 | 1030 | 1.00 | 1.00 | 2.00 | 3.43 | 15.48 |
| 67386 | Retailer 19 | 172 | 1.00 | 1.00 | 2.12 | 4.72 | 11.92 |
| 22946 | Retailer 20 | 1727 | 1.00 | 1.00 | 2.33 | 4.00 | 25.02 |
| 90306 | Retailer 21 | 812 | 1.00 | 2.00 | 3.00 | 5.12 | 31.12 |
| 127839 | Retailer 22 | 149 | 1.00 | 2.00 | 3.00 | 5.00 | 17.32 |
| 21066 | Retailer 23 | 30 | 1.00 | 1.00 | 3.00 | 4.00 | 9.06 |
| 64416 | Retailer 24 | 99 | 1.00 | 1.00 | 3.00 | 4.80 | 19.50 |
| 76446 | Retailer 25 | 72 | 1 | 2.00 | 3.00 | 7.00 | 27.69 |
| 69126 | Retailer 26 | 519 | 1 | 2.00 | 3.00 | 5.48 | 21.84 |
| 75066 | Retailer 27 | 74 | 1 | 2.00 | 3.00 | 5.00 | 17.32 |
| 68576 | Retailer 28 | 489 | 1 | 1.00 | 3.00 | 4.92 | 12.93 |
| 140449 | Retailer 3 - B2B Email | 4493 | 1 | 1.00 | 3.50 | 10.50 | 25.08 |
| 26426 | Retailer 29 | 47 | 1 | 2.00 | 3.79 | 5.00 | 10.13 |
| 72366 | Retailer 30 | 46 | 1 | 2.92 | 4.00 | 5.00 | 13.22 |

There is substantial variation in the median edge score across audiences. For some audiences, the median edge score is only 1.0 and therefore there are no other edges/ pathways corroborating these edges. In contrast, for other audiences the median edge score is 3-4, showing there is a substantial number of other edges and pathways corroborating these edges.

Continuing with illustrative example data, the aggregate edge scores for identifying cookie publishers is shown in Table 5:

TABLE 5

| Publisher | | Count | Quantiles | | | |
|---|---|---|---|---|---|---|
| Id | Name | | 25% | 50% | 75% | Max |
| 453909 | Publisher 1 | 868 | 1.00 | 1.00 | 1.57 | 30 |
| 372288 | Publisher 2 - Interactive One | 818 | 1.00 | 1.11 | 2.13 | 35 |
| 369458 | Publisher 2 - Patch | 1258 | 1.00 | 1.17 | 3.34 | 36 |
| 369548 | Publisher 2 - Interactive One (2) | 2129 | 1.00 | 1.36 | 2.61 | 29 |
| 453979 | Publisher 3 - match data | 8897 | 1.00 | 2.00 | 4.00 | 54 |
| 375008 | Publisher 4 - alt outlet | 1012 | 1.00 | 2.00 | 4.04 | 44 |
| 374968 | Publisher 4 - outlet 1 | 3177 | 1.00 | 2.00 | 3.51 | 34 |
| 371658 | Publisher 4 - outlet 2 | 2416 | 1.00 | 2.00 | 5.80 | 44 |
| 406606 | Publisher 4 - outlet 3 | 13866 | 1.00 | 2.00 | 4.00 | 43 |
| 369858 | Publisher 4 - outlet 4 | 944 | 1.00 | 2.00 | 4.00 | 54 |
| 369828 | Publisher 4 - outlet 5 | 1554 | 1.06 | 2.00 | 4.34 | 54 |
| 448046 | Publisher 5 - match data encryption key | 28614 | 1.00 | 2.00 | 3.00 | 54 |
| 363958 | Publisher 4 - outlet 6 | 1645 | 1.00 | 2.00 | 5.00 | 54 |
| 362226 | Publisher 4 - outlet 7 | 1586 | 1.00 | 2.00 | 3.00 | 30 |
| 369948 | Publisher 4 - outlet 8 | 7074 | 1.00 | 2.00 | 4.00 | 54 |
| 377808 | Publisher 6 (Email) | 3270 | 1.00 | 2.00 | 6.00 | 54 |

TABLE 5-continued

| Publisher | | Count | Quantiles | | | |
|---|---|---|---|---|---|---|
| Id | Name | | 25% | 50% | 75% | Max |
| 366798 | Publisher 7 - Email | 1640 | 1.00 | 2.11 | 7.00 | 54 |
| 370668 | Publisher 4 - outlet 9 | 2820 | 2.00 | 2.57 | 5.01 | 54 |
| 376238 | Publisher 4 - outlet 10 | 1007 | 1.00 | 2.75 | 7.00 | 39 |
| 376448 | Publisher 4 - outlet 11 | 1554 | 1.15 | 3.00 | 7.00 | 54 |
| 378818 | Publisher 8 | 1494 | 1.00 | 3.00 | 8.00 | 54 |
| 386786 | Publisher 9 | 1013 | 2.00 | 3.00 | 5.00 | 44 |
| 406106 | Publisher 10 | 1948 | 2.00 | 3.00 | 7.31 | 54 |
| 370358 | Publisher 4 - outlet 12 | 1780 | 2.00 | 3.00 | 7.00 | 54 |
| 422936 | Publisher 11 | 986 | 1.00 | 3.00 | 8.00 | 54 |
| 361037 | Publisher 12 | 1179 | 1.10 | 3.00 | 5.00 | 44 |
| 377328 | Publisher 4 - outlet 13 | 962 | 2.00 | 3.37 | 8.00 | 44 |
| 378288 | Publisher 13 | 906 | 1.00 | 4.00 | 9.74 | 54 |
| 420216 | Publisher 14 | 1072 | 1.00 | 4.00 | 9.00 | 40 |
| 401656 | Publisher 15 - outlet 1 | 1063 | 3.00 | 4.23 | 10.14 | 54 |
| 366648 | Publisher 15 - outlet 2 | 1221 | 3.00 | 5.00 | 11.00 | 54 |
| 377708 | Publisher 16 | 1598 | 2.00 | 5.31 | 10.00 | 54 |
| 403656 | Publisher 17 | 920 | 2.14 | 6.00 | 11.00 | 43 |

Again, it may be seen that there is significant variation across different third-party data providers.

Using results selectivity module 6, the user has the ability to selectively analyze results based on one or more desired factors. For example, one may not wish to use data from third-party data provider A when measuring the accuracy of that data provider, i.e., one may want to consider removing self-corroboration. Table 6 shows how the edge scores change when self-corroboration is removed.

TABLE 6

| Edge Type | Count | Mean | Standard Deviation | Quantiles | | | | | |
|---|---|---|---|---|---|---|---|---|---|
| | | | | Min | 50% | 70% | 80% | 90% | 95% | Max |
| COOKIE_IDENTIFICATION | 16,081 | 1.00 | 3.34 | 0.00 | 0.00 | 0.00 | 0.00 | 3.05 | 6.33 | 33.68 |
| COOKIE_OBSERVATION | 122,163 | 0.42 | 0.93 | 0.00 | 0.00 | 0.42 | 0.65 | 1.17 | 1.95 | 16.82 |
| EMAIL_PEL_MERGING | 7,233 | 0.24 | 0.93 | 0.00 | 0.00 | 0.00 | 0.00 | 0.00 | 2.00 | 15.57 |
| HOUSEHOLD | 2,287 | 0.00 | 0.00 | 0.00 | 0.00 | 0.00 | 0.00 | 0.00 | 0.00 | 0.00 |
| MOBILE_IDENTIFICATION | 1,692 | 0.00 | 0.03 | 0.00 | 0.00 | 0.00 | 0.00 | 0.00 | 0.00 | 0.41 |
| MOBILE_OBSERVATION | 861 | 0.00 | 0.05 | 0.00 | 0.00 | 0.00 | 0.00 | 0.00 | 0.00 | 0.97 |
| OFFLINE_SR | 7,230 | 0.85 | 2.16 | 0.00 | 0.00 | 0.00 | 0.00 | 3.51 | 5.85 | 16.34 |

For all edge types, at least 50% of edges in this example have no corroborating data. This shows that a significant portion of the full corroboration of edges involves self-corroborating data.

The results broken down by partner for Offline SR, again in an illustrative example, are shown in Table 7:

TABLE 7

| Audience | | Count | Quantiles | | | | | |
|---|---|---|---|---|---|---|---|---|
| Id | Name | | 50% | 70% | 80% | 90% | 95% | Max |
| 134459 | Publisher 18 | 49 | 0.00 | 0.00 | 0.00 | 0.00 | 0.84 | 4.11 |
| 86876 | Publisher 19 | 111 | 0.00 | 0.00 | 0.00 | 0.00 | 0.90 | 8.52 |
| 75976 | Publisher 20 | 66 | 0.00 | 0.00 | 0.00 | 0.51 | 1.63 | 5.65 |
| 87366 | Publisher 21 | 43 | 0.00 | 0.00 | 0.00 | 1.20 | 3.30 | 9.44 |
| 140459 | Publisher 22 | 59 | 0.00 | 0.00 | 0.00 | 1.78 | 4.18 | 6.91 |
| 113229 | Publisher 23 | 2731 | 0.00 | 0.00 | 0.00 | 2.34 | 4.58 | 16.06 |
| 19056 | Publisher 24 | 51 | 0.00 | 0.00 | 2.22 | 3.31 | 5.06 | 9.45 |
| 30066 | Publisher 25 | 36 | 0.00 | 0.00 | 0.98 | 3.35 | 3.74 | 6.70 |
| 110529 | Publisher 26 | 228 | 0.00 | 0.00 | 1.05 | 3.37 | 5.41 | 10.90 |
| 8928 | Publisher 27 | 423 | 0.00 | 0.00 | 0.00 | 3.85 | 7.00 | 13.63 |
| 22946 | Publisher 28 | 201 | 0.00 | 0.00 | 0.00 | 3.87 | 6.29 | 12.92 |
| 61486 | Publisher 29 | 1504 | 0.00 | 0.00 | 1.56 | 3.87 | 6.14 | 16.18 |
| 48306 | Publisher 30 | 461 | 0.00 | 0.00 | 0.00 | 3.88 | 7.25 | 14.85 |
| 87516 | Publisher 31 | 111 | 0.00 | 0.00 | 1.95 | 4.00 | 6.59 | 13.99 |

TABLE 7-continued

| Audience | | | Quantiles | | | | | |
|---|---|---|---|---|---|---|---|---|
| Id | Name | Count | 50% | 70% | 80% | 90% | 95% | Max |
| 104299 | Publisher 32 | 27 | 0.00 | 0.05 | 1.99 | 4.09 | 5.51 | 9.16 |
| 140449 | Publisher 33 | 289 | 0.00 | 0.00 | 2.39 | 4.82 | 5.77 | 13.81 |
| 111629 | Publisher 34 | 145 | 0.00 | 0.00 | 2.34 | 5.24 | 7.37 | 13.49 |
| 14926 | Publisher 35 | 344 | 0.00 | 0.00 | 2.05 | 5.30 | 8.57 | 14.49 |
| 68576 | Publisher 36 | 53 | 0.00 | 1.34 | 3.48 | 6.86 | 8.36 | 14.49 |
| 69126 | Publisher 37 | 55 | 0.00 | 1.90 | 5.57 | 8.19 | 9.76 | 14.87 |
| 90306 | Publisher 38 | 105 | 0.00 | 1.94 | 3.93 | 8.24 | 9.43 | 16.34 |

Figure 6:
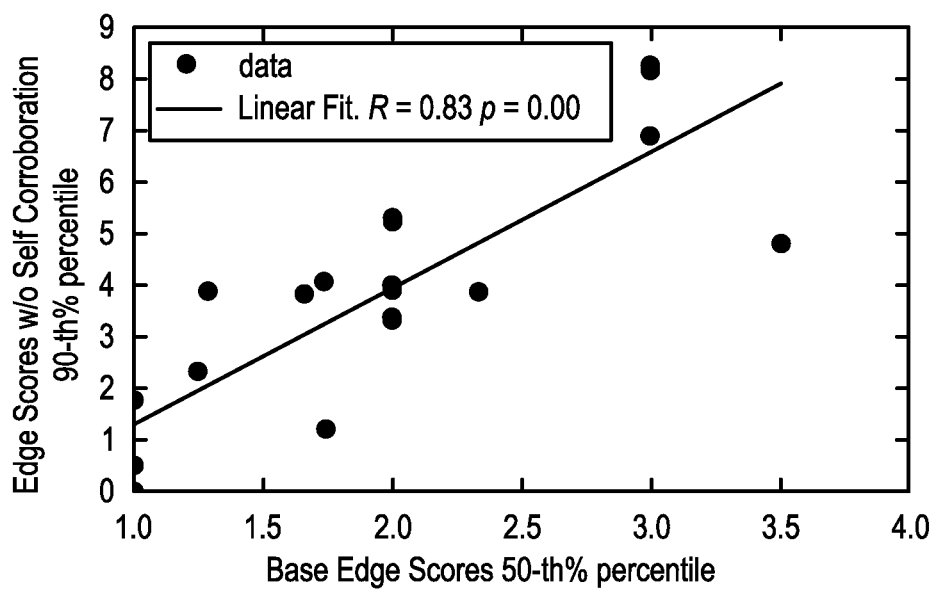
FIG. 6 is a plot illustrating the correlation of results with self-corroboration and those without self-corroboration.

There is a linear correlation between the results with self-corroboration (original results) and those without self-corroboration, as shown in the linear fit graph of FIG. 6.

When productionized, the methods presented herein allow for the assignment of a score to every edge within the identity graph. One could then selectively include edges of higher scores for applications that require more accuracy. Further, in certain implementations one could use node/edge scores from an entity resolution service, such as the AbiliTec service from Acxiom Corporation, in defining single edge conductivity for use as input to these methods.

Figure 7:
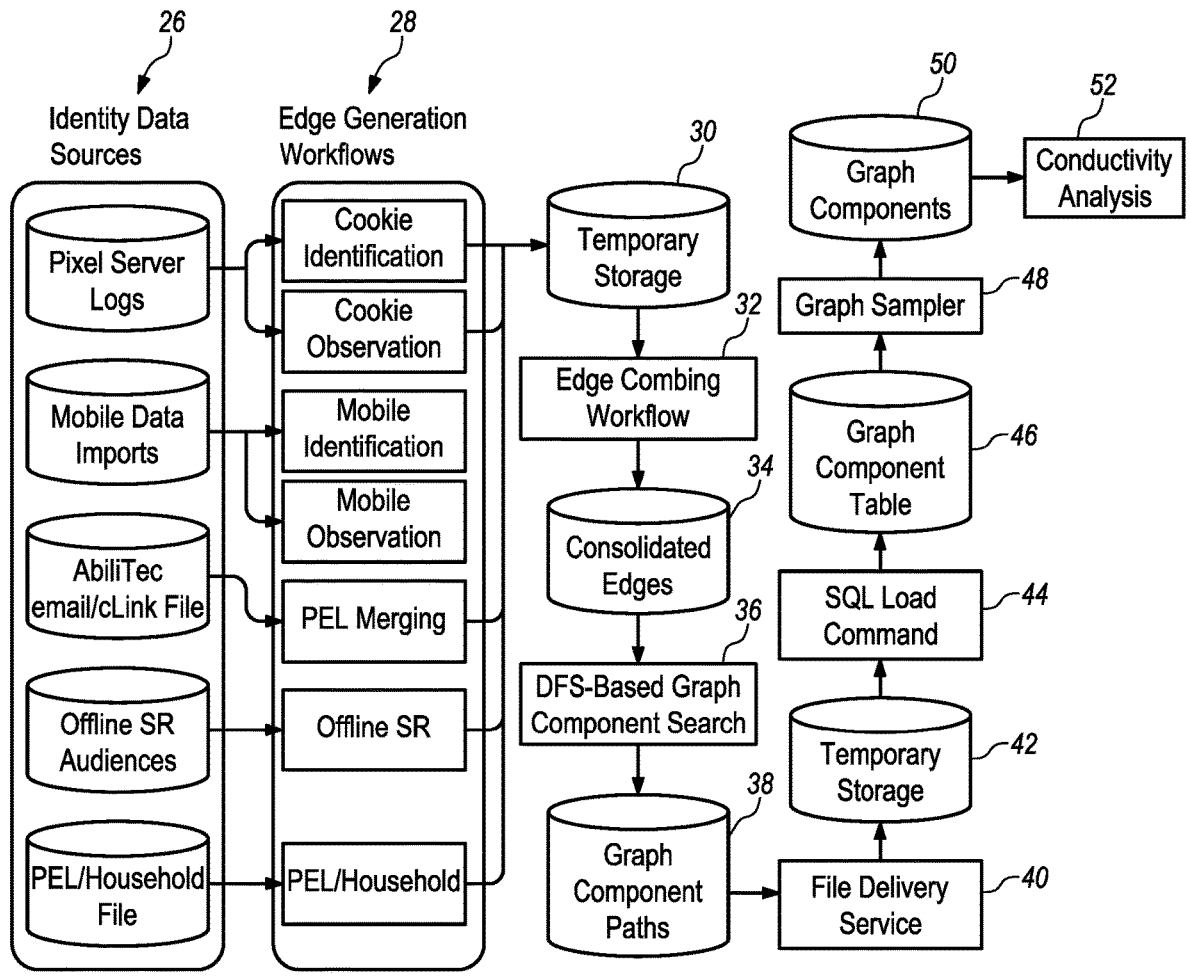
FIG. 7 is a diagram of data flows within a computing environment utilizing an implementation of the present invention.

The calculations are implemented in a networked computer system that allows for the computation of a sample of identity graph components. FIG. 7 illustrates how raw identity data are transformed into identity graph components and how the connectivity of these components is quantified. The process begins with raw Identity data 26 as stored in several different file formats on HDFS (a distributed file system). This data, at different identity data storage media resources separated either physically or virtually in storage space, may include pixel server logs; mobile data imports; AbiliTec email/consumer link files; offline SR audiences; and PEL/Household files. The identity data is integrated into the system through data integration input routine 2, which receives the raw identity data from the data sources 1 and temporarily stores the data in a temporary storage area, where the graph construction module 3 uses the raw data to construct the graph for analysis. Raw Identity data is converted into a common edge type using several different Hadoop® workflows, one for each data source, utilizing edge generation workflows 28. The Hadoop® software utility collection by Apache Software Foundation is an open-source framework for distributed processing large data sets across computing clusters. Specific edge generation workflows 28 are used to each data type. For example, cookie identification and cookie observation edge generation workflows may be used with pixel server logs; mobile identification and mobile observation edge generation workflows may be used with mobile data imports; a PEL merging edge generation workflow may be used with AbiliTec email/consumer link files; an offline SR edge generation workflow may be used with offline SR audiences; and a PEL/Household edge generation workflow may be used with the PEL/Household file. The resulting edge types are written to temporary storage 30. The different temporary edge stores are combined together at edge combining workflow 32 into a single consolidated edge store 34 using a Hadoop® workflow. This workflow also partitions and sorts the consolidated edge store so that the join against this store in the subsequent graph search workflow may be performed efficiently. A Hadoop® workflow is used to find graph components through depth first search (DFS) at DFS-based graph component search 36, and the results stored at graph component paths 38.

For each starting node, the process starts building paths through iterative application of a DFS at file delivery service 40. In each step current paths are joined against the consolidated edge store to find edges that extend each path. Five iterations of DFS are performed in this implementation. Next, the different graph paths from the same source node are combined together to give the graph component centered at each starting node. The resulting graph components are written to HDFS, at temporary storage 42. The graph component data in one implementation, for example, is delivered to a cloud storage service such as Amazon® S3. Amazon® Simple Storage Service, or Amazon® S3, is a service offered by Amazon.com that provides object storage through a web service interface. This delivery may be performed using the File Delivery Service offered by LiveRamp, Inc. The Amazon® S3 data at temporary storage 42 is then loaded using SQL load command process 44 into an Amazon Redshift® table for subsequent analysis, implemented as graph component table 46. Amazon Redshift® is a data warehousing product, also from Amazon.com. A Python® process, graph sampler 48, is used to download a sample of graph paths from the Amazon Redshift® table 46, and the sample is written to local file on a data analysis machine at graph components 50. Python® is an interpreted, high-level programming language provided by Python Software Foundation. A Jupyter® notebook is used to perform a conductivity analysis process 52 on the sample of graph paths using methods described herein. Jupyter® notebook is a web-based interactive computational environment for creating web applications, servers, or documents provided by Project Jupyter. In particular, a singular value decomposition (SVD) is used in certain implementations to efficiently solve the set of linear equations corresponding to the circuit model.

In other implementations, these methods can be scaled up and applied to a full entity resolution graph.

As background to the foregoing disclosure, circuit computations in general may be described now as follows. Conductivity (g) is related to the current (I) and potential difference (Voltage, V) by Ohm's law:

$$I = gV$$

Figure 8:
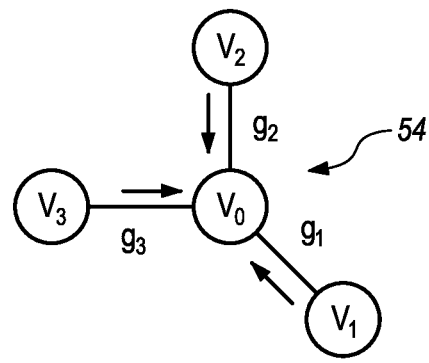
FIG. 8 is a flow diagram illustrating the electrical circuit analysis principle that total flow in and out of a given node must sum to zero (prior art).

Using the water flow analogy commonly employed in electrical circuit analysis, the current is analogous to the rate of flow and the voltage is equivalent to pressure. In a network of conductors (i.e., pipes) the total flow into and out of a given node must sum to zero, as illustrated by the flow diagram 54 shown in FIG. 8.

$$\sum_{i,j} I_{i,j} = 0$$

Here, $I_{i,j}$ indexes the current flowing from node i to node j through edge i, j. The flow through each edge is related to the conductivity, and the difference in voltage (i.e., pressure) between the two nodes.

$$I_{i,j} = g_{i,j}(V_j - V_i)$$

$$\sum_{i,j} g_{i,j}(V_j - V_i) = 0$$

There exists one of these equations for every node within the graph, and the set of equations for all nodes gives a linear system of equations.

Figure 9:
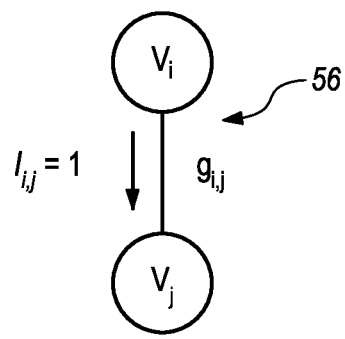
FIG. 9 is a flow diagram illustrating the application of electrical circuit analysis and Ohm's law to calculating net conductivity (prior art).

It is necessary to compute the net conductivity between node i and node j, accounting for both edge i, j (if there exists an edge between them) and all other pathways between these two nodes. To do that, the system applies a net current between them, computes the potential difference between Vi and Vj, and then use Ohm's law to compute the net conductivity $g^*_{i,j}$ (where * denotes net conductivity), as shown graphically by flow diagram 56 shown in FIG. 9.

$$g^*_{i,j} = \frac{1}{V_j - V_i}$$

The system then solves for potential difference in voltages (i.e., difference in pressure) by solving the linear system of equations.

Unless otherwise stated, all technical and scientific terms used herein have the same meaning as commonly understood by one of ordinary skill in the art to which this invention belongs. All terms used herein should be interpreted in the broadest possible manner consistent with the context. When a grouping is used herein, all individual members of the group and all combinations and subcombinations possible of the group are intended to be individually included in the disclosure. All references cited herein are hereby incorporated by reference to the extent that there is no inconsistency with the disclosure of this specification. If a range is expressed herein, such range is intended to encompass and disclose all sub-ranges within that range and all particular points within that range.

The present invention has been described with reference to certain preferred and alternative embodiments that are intended to be exemplary only and not limiting to the full scope of the present invention, as set forth in the appended claims.

The invention claimed is:

1. A method for optimizing data resolution using a node and edge network, the method comprising the steps of:
   a. receiving from at least one of a plurality of identity data sources at least one raw data set
   b. generating an edge type from each raw data set from one of the plurality of identity data storage media resources;
   c. storing the edge type from each data set in a first temporary storage media;
   d. combining the edge types to produce a consolidated edge store;
   e. searching the consolidated edge store to find graph component paths in the consolidated edge store;
   f. storing the graph component paths in a graph component paths storage media;
   g. joining current paths against the consolidated edge store in order to find edges that extend each path in the consolidated edge store;
   h. storing the edges that extend each path in the consolidated edge in a graph component table;
   i. downloading a sample of graph paths from the graph component table;
   j. creating a sample of graph paths; and
   k. receiving a set of conductivity parameters, assigning a conductivity parameter from the set of conductivity parameters to each graph path in the sample of graph paths, computing a net conductivity for each graph path in the sample of graph paths to produce a set of linear equations, and performing singular value decomposition (SVD) to solve the set of linear equations.

2. A non-transitory computer-readable medium storing instructions that, when executed by a computer, cause it to:
   a. receive at least one raw data set from at least one of a plurality of identity data storage media resources;
   b. generate an edge type from each raw data set from one of the plurality of identity data storage media resources;
   c. store the edge type from each data set in a first temporary storage media;
   d. combine the edge types to produce a consolidated edge store;
   e. search the consolidated edge store to find graph component paths in the consolidated edge store;
   f. store the graph component paths in a graph component paths storage media;
   g. join current paths against the consolidated edge store in order to find edges that extend each path in the consolidated edge store;
   h. store the edges that extend each path in the consolidated edge in a graph component table;
   i. download a sample of graph paths from the graph component table;
   j. create a sample of graph paths; and
   k. receive a set of conductivity parameters, then assign a conductivity parameter from the set of conductivity parameters to each graph path in the sample of graph paths, then compute a net conductivity for each graph path in the sample of graph paths to produce a set of linear equations, then perform singular value decomposition (SVD) to solve the set of linear equations.

3. A computing system for optimizing data resolution using a node and edge network, comprising:
   a. a plurality of identity data storage media resources each comprising at least one raw data set from at least one identity data source;
   b. a data integration input routine in communication with the plurality of identity data storage media resources and executing at a microprocessor coupled to a non-transitory media storing instructions for executing the data integration input routine, the data integration input routine comprising:
      i. a plurality of edge generation workflows, wherein each edge generation workflow is configured to receive a raw data set from one of the plurality of identity data storage media resources and to generate an edge type from each raw data set from one of the plurality of identity data storage media resources; and
      ii. a first temporary storage media in communication with the plurality of edge generation workflows to receive and store the edge type from each data set;

c. a graph construction module in communication with the data integration input routine and executing at the microprocessor, the graph construction module comprising:
   i. an edge combining workflow to receive the edge type from each data set and combine the edge types to produce a consolidated edge store;
   ii. a consolidated edges storage media configured to receive the consolidated edge store from the edge combining workflow;
   iii. a graph component search workflow in communication with the consolidated edges storage media and configured to receive the consolidated edge store and find graph component paths in the consolidated edge store;
   iv. a graph component paths storage media configured to receive the graph component paths from the graph component search workflow;
   v. a file delivery service in communication with the graph components path storage media and configured to receive the graph component paths from the graph component paths storage media and join current paths against the consolidated edge store in order to find edges that extend each path in the consolidated edge store;
   vi. a second temporary storage configured to receive the edges that extend each path in the consolidated edge store from the file delivery service;
   vii. a SQL load command workflow, in communication with secondary temporary storage and configured to load the edges that extend each path in the consolidated edge store;
   viii. a graph component table storage medium in communication with the SQL load command workflow and configured to receive and store the edges that extend each path in the consolidated edge store and store the edges that extend each path in the consolidated edge in a graph component table;
   ix. a graph sampler workflow in communication with the graph component table and configured to download a sample of graph paths from the graph component table and create a sample of graph paths; and
   x. a graph components storage medium configured to receive the sample of graph paths from the graph sampler workflow; and
a circuit analysis engine in communication with the graph construction module and executing at the microprocessor, the circuit analysis engine in communication with the graph component table storage medium and configured to receive the sample of graph paths from the graph sampler workflow and a set of conductivity parameters, assign a conductivity parameter from the set of conductivity parameters to each graph path in the sample of graph paths, compute a net conductivity for each graph path in the sample of graph paths from the graph sampler workflow to produce a set of linear equations, and perform singular value decomposition (SVD) to solve the set of linear equations.

4. The system of claim 3, wherein at least one of the plurality of identity data storage media resources comprises a plurality of raw data sets, and a different one of the plurality of edge generation workflows is configured to receive each of such plurality of raw data sets.

5. The system of claim 3, wherein the edge combining workflow is further configured to partition and sort the consolidated edge store.

6. The system of claim 3, wherein the file delivery service is further configured to perform multiple iterations in order to receive the graph component paths from the graph component paths storage media and join current paths against the consolidated edge store in order to find edges that extend each path in the consolidated edge store.

7. The system of claim 6, wherein the file delivery service is configured to perform at least five iterations in order to receive the graph component paths from the graph component paths storage media and join current paths against the consolidated edge store in order to find edges that extend each path in the consolidated edge store.

8. The system of claim 3 further comprising a results selectivity module in communication with the circuit analysis engine and executing at the microprocessor storing instructions for executing the results selectivity module, the results selectivity module configured to allow for modifying the set of conductivity parameters.

* * * * *